(12) United States Patent
Imada

(10) Patent No.: US 9,976,030 B2
(45) Date of Patent: *May 22, 2018

(54) RESIN COMPOSITION AND RESIN MOLDED ARTICLE

(71) Applicant: FUJI XEROX CO., LTD., Tokyo (JP)

(72) Inventor: Akira Imada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/227,037

(22) Filed: Aug. 3, 2016

(65) Prior Publication Data

US 2017/0247538 A1    Aug. 31, 2017

(30) Foreign Application Priority Data

Feb. 25, 2016 (JP) ................................. 2016-034556

(51) Int. Cl.
*C08L 69/00*    (2006.01)

(52) U.S. Cl.
CPC ................... *C08L 69/00* (2013.01)

(58) Field of Classification Search
CPC ....................................................... C08L 69/00
USPC ........................................................... 524/151
See application file for complete search history.

(56) References Cited

U.S. PATENT DOCUMENTS

| 2006/0264599 A1* | 11/2006 | Anno | B29C 45/0001 528/272 |
| 2010/0069543 A1* | 3/2010 | Monden | C08K 5/42 524/161 |
| 2013/0317150 A1* | 11/2013 | Wan | C08L 67/02 524/127 |

* cited by examiner

*Primary Examiner* — Kelechi Egwim
(74) *Attorney, Agent, or Firm* — Sughrue Mion, PLLC (57) ABSTRACT

A resin composition contains a polycarbonate resin, a reaction product of a glycidyl-group-containing polyethylene copolymer with a polyethylene terephthalate resin, a polyethylene terephthalate resin that has not reacted with the glycidyl-group-containing polyethylene copolymer, an organic phosphorus flame retardant, and a flame-retardant anti-drip agent, wherein the amount of the polyethylene terephthalate resin in the reaction product is approximately not less than 3 mass % relative to the amount of the whole reaction product.

4 Claims, 1 Drawing Sheet

RESIN COMPOSITION AND RESIN MOLDED ARTICLE

CROSS-REFERENCE TO RELATED APPLICATIONS

This application is based on and claims priority under 35 USC 119 from Japanese Patent Application No. 2016-034556 filed Feb. 25, 2016.

BACKGROUND (i) Technical Field

The present invention relates to a resin composition and a resin molded article.

(ii) Related Art

A variety of resin compositions have been available and used in various applications. They are, for example, used in resin molded articles such as the parts and cases of household electric appliances and automobiles and the housings of office equipment and electronic and electrical equipment.

Polycarbonate resins are thermoplastic resins having an excellent impact resistance and heat resistance and are widely used in resin molded articles such as parts and cases in the field of machinery, automobiles, electrics, and electronics. Meanwhile, polyethylene terephthalate resins have a good molding fluidity.

In recent years, resin molded articles made of resin compositions have come to have a small thickness, and resin molded articles formed of a resin composition containing a polycarbonate resin and a polyethylene terephthalate rein need to have an enhanced flame resistance and surface impact strength.

SUMMARY

According to an aspect of the invention, a resin composition contains a polycarbonate resin, a reaction product of a glycidyl-group-containing polyethylene copolymer with a polyethylene terephthalate resin, a polyethylene terephthalate resin that has not reacted with the glycidyl-group-containing polyethylene copolymer, an organic phosphorus flame retardant, and a flame-retardant anti-drip agent, wherein the amount of the polyethylene terephthalate resin in the reaction product is approximately not less than 3 mass % relative to the amount of the whole reaction product.

BRIEF DESCRIPTION OF THE DRAWING

Exemplary embodiments of the present invention will be described in detail based on the following FIGURE, wherein.

DETAILED DESCRIPTION

Exemplary embodiments of the invention will now be described. Exemplary embodiments are merely examples of the invention, and the invention is not limited thereto.

Resin Composition

The resin composition according to a first exemplary embodiment contains a polycarbonate resin, a reaction product of a glycidyl-group-containing polyethylene copolymer with a polyethylene terephthalate resin, a polyethylene terephthalate resin that as not reacted with the glycidyl-group-containing polyethylene copolymer, an organic phosphorus flame retardant, and a flame-retardant anti-drip agent. In the resin composition, the amount of the polyethylene terephthalate resin in the reaction product approximately not less than 3 mass % relative to the amount of the whole reaction product.

The reaction product of a glycidyl-group-containing polyethylene copolymer with a polyethylene terephthalate resin is presumed to have a larger molecular weight than a polyethylene terephthalate resin that has not reacted with the glycidyl-group-containing polyethylene copolymer. Furthermore, it is believed that the glycidyl-group-containing polyethylene copolymer itself serves as an elastomer having a rubber-like elasticity when it is cooled. The presence of the reaction product, which has a large molecular weight and serves as an elastomer, in the resin composition enables production of a resin molded article having a higher surface impact strength than a product made without using such a reaction product. Controlling the amount of the polyethylene terephthalate resin in the reaction product to be approximately not less than 3 mass % relative to the amount of the whole reaction product is believed to enable the reaction product having a further enhanced molecular weight to be diffused in the resin composition, which leads to the production of a resin molded article having a much higher surface impact strength than a product made without using such a reaction product.

The organic phosphorus flame retardant and flame-retardant anti-drip agent used in the resin composition according to the first exemplary embodiment contribute to an enhancement in the flame resistance of a resin molded article; for instance, if the resin molded article is burned, a combination of these materials with the glycidyl-group-containing polyethylene resin is expected to enable easy formation of a carbonized layer on the surface of the resin molded article so that the flame resistance of the resin molded article is enhanced.

The components contained in the resin composition according to the first exemplary embodiment will now be described.

Reaction Product

The reaction product of a glycidyl-group-containing polyethylene copolymer with a polyethylene terephthalate resin is, for example, a reaction product in which a terminal group of the polyethylene terephthalate resin has been bonded to a glycidyl group of the glycidyl-group-containing polyethylene copolymer. The reaction product is in a state in which polyethylene terephthalate resins have been bonded to each other via the glycidyl-group-containing polyethylene copolymer and is therefore believed to have a larger molecular weight than a polyethylene terephthalate resin that has not reacted with the glycidyl-group-containing polyethylene copolymer.

The reaction product of a glycidyl-group-containing polyethylene copolymer with a polyethylene terephthalate resin is hereinafter referred to as "reaction product". The polyethylene terephthalate resin that has reacted with the glycidyl-group-containing polyethylene copolymer, namely, the polyethylene terephthalate resin in the reaction product is referred to as "reacted polyethylene terephthalate resin", and the polyethylene terephthalate resin that has not reacted with the glycidyl-group-containing polyethylene copolymer is referred to as "unreacted polyethylene terephthalate resin". The term "polyethylene terephthalate resin the resin composition" refers to both the reacted polyethylene terephthalate resin and the unreacted polyethylene terephthalate resin.

The amount of the reacted polyethylene terephthalate resin (polyethylene terephthalate resin in reaction product) is approximately not less than 3 mass %, preferably from 3.5 mass % to 20 mass %, and more preferably from 5 mass % to 15 mass % relative to the amount of the whole reaction product. In the case where the amount of the reacted polyethylene terephthalate resin is less than 3 mass %, the amount of the reaction product with a large molecular weight in the resin composition (substantially a polyethylene terephthalate resin of which the molecular weight has been enhanced) is decreased as compared with the case where the amount is within the above-mentioned range, which results in a reduction in the surface impact strength of a resin molded article to be produced. In the case where the amount of the polyethylene terephthalate resin in the reaction product is greater than 20 mass %, the surface impact strength is similar to that in the case where the amount is in the range of 3 mass % to 20 mass %; however, the productivity of the reaction product may be reduced.

The amount of the reacted polyethylene terephthalate resin in the resin composition can be measured as follows. A measurement sample is dissolved in chloroform and then washed, and this process is repeated three times. Then, the insoluble matter is separated and further dissolved in 1,1,1,3,3,3-hexafluoro-2-propanol (HFIP) and washed, and this process is repeated three times. The matter insoluble in the HFIP is separated and dried. Then, the dried product is added to $CDCL_3$ as a swelling solvent, and the insoluble matter is subjected to gel nuclear magnetic resonance (NMR).

An example of a process for producing the reaction production will now be described.

A mixture of the polyethylene terephthalate resin and the glycidyl-group-containing polyethylene copolymer is, for example, melt-kneaded with a twin screw extruder or another apparatus to allow a terminal group of the polyethylene terephthalate resin to be bonded to a glycidyl group of the glycidyl-group-containing polyethylene copolymer, so that a melt-kneaded product containing the reaction product of the polyethylene terephthalate resin with the glycidyl-group-containing polyethylene copolymer is produced. It is generally hard to allow the whole polyethylene terephthalate content to thoroughly react; hence, the melt-kneaded product containing an unreacted polyethylene terephthalate resin in addition to the reaction product. Thus, in the production of the resin composition according to the first exemplary embodiment, use of such a melt-kneaded product eliminates additional use of a polyethylene terephthalate resin. Depending on the amount of the copolymer to be used, the melt-kneaded product may contain a glycidyl-group-containing polyethylene copolymer that has not reacted with the polyethylene terephthalate resin.

It is believed that the glycidyl-group-containing polyethylene copolymer is likely to cause self-reaction due to heating. Hence, a process in which the polyethylene terephthalate resin is melt-kneaded and in which the glycidyl-group-containing polyethylene copolymer is then added thereto and melt-kneaded is suitable because it contributes to an enhancement in the reactivity of the polyethylene terephthalate resin with the glycidyl-group-containing polyethylene copolymer and an increase in the amount of the reacted polyethylene terephthalate resin as compared with the case where a mixture of the polyethylene terephthalate resin and the glycidyl-group-containing polyethylene copolymer is melt-kneaded or the case where the glycidyl-group-containing polyethylene copolymer is melt-kneaded in advance of the melt-kneading of the polyethylene terephthalate resin.

The other materials of the resin composition, particularly the organic phosphorus flame retardant, are added after or during the melt-kneading of the polyethylene terephthalate resin and the glycidyl-group-containing polyethylene copolymer (for instance, in the second half of the time of the melt-kneading). If the other materials of the resin composition, particularly the organic phosphorus flame retardant, are added at the same time as the start of the melt-kneading of the polyethylene terephthalate resin and the glycidyl-group-containing polyethylene copolymer or before the second half of the time of the melt-kneading, an increase in free volume and a decrease in the temperature of the melt-kneaded resin on the addition of the materials may impair the reactivity of the polyethylene terephthalate resin with the glycidyl-group-containing polyethylene copolymer and thus result in the amount of the reacted polyethylene terephthalate resin being below 3 mass % relative to the total amount of the reaction product and unreacted polyethylene terephthalate resin.

The melt kneader used in the melt-kneading is suitably a twin screw extruder but is not limited thereto; general melt kneaders, such as a single screw extruder, can be employed. In the melt-kneading, the barrel (cylinder) temperature may be, for example, in the range of 240° C. to 280° C., and the die temperature may be, for instance, in the range of 240° C. to 280° C. The time of the melt-kneading is properly determined, for instance, on the basis of the amounts of the materials to be used; for example, the average residence time in a twin screw extruder may be 10 minutes or less.

The amount of the reaction product in the resin composition is, for instance, preferably in the range of 3 mass % to 15 mass %, and more preferably 4 mass % to 10 mass %. The amount of the reaction product within such a range enables an enhancement in the molding fluidity of the resin and thus leads to an increase in the surface impact strength of a resin molded article in some cases as compared with the case where the amount is out of the range.

The glycidyl-group-containing polyethylene copolymer is a copolymer containing an ethylene unit and a glycidyl-group-containing (meth)acrylate unit. Examples of the glycidyl-group-containing (meth)acrylate unit include constitutional units derived from monomers such as glycidyl (meth)acrylate, a vinyl glycidyl ether, a (meth)acryl glycidyl ether, a 2-methyl propenyl glycidyl ether, a styrene-p-glycidyl ether, glycidyl cinnamate, an itaconic acid glycidyl ester, and N-[4-(2,3-epoxypropoxy)-3,5-dimethylbenzyl] methacrylamide. Among these, glycidyl(meth)acrylate can be employed because it enables production of a polyethylene copolymer having a glass transition temperature of not more than 0° C. The term "(meth)acryl" refers to acryl or methacryl.

The glycidyl-group-containing polyethylene copolymer contains an ethylene unit and a glycidyl-group-containing (meth)acrylate unit. The glycidyl-group-containing (meth) acrylate unit content in the glycidyl-group-containing polyethylene copolymer is from 2 mass % to 20 mass %. The glycidyl-group-containing polyethylene copolymer can be a polyethylene copolymer having a glass transition temperature of not more than 0° C. or a copolymer in which a polymerizable vinyl monomer has been graft-polymerized with the main chain of a polyethylene copolymer containing an ethylene unit and a glycidyl-group-containing (meth) acrylate unit. Such a glycidyl-group-containing polyethylene copolymer is expected to enhance the impact resistance of a resin molded article to be produced as compared with a glycidyl-group-containing polyethylene copolymer which contains an ethylene unit and a glycidyl-group-containing (meth)acrylate unit and in which the glycidyl-group-containing (meth)acrylate unit content is less than 2 mass % or greater than 20 mass %. In the case where the glycidyl-group-containing (meth)acrylate unit content in the glycidyl-group-containing polyethylene copolymer is less than 2 mass %, the molecular weight of an aromatic polycarbonate resin or an aromatic polyester resin is not enhanced as compared with the case where the content is within the above-mentioned range. In the case where the glycidyl-group-containing (meth)acrylate unit content in the glycidyl-group-containing polyethylene copolymer is greater than 20 mass %, it is speculated that the fluidity of the resin composition is impaired as compared with the case where the content is within the above-mentioned range. In the case where the glass transition temperature is greater than 0° C., the elasticity of a resin molded article to be produced is expected to be reduced as compared with the case where the glass transition temperature is not more than 0° C.

The glass transition temperature of the polyethylene copolymer refers to a glass transition temperature measured as follows. Heat capacity is measured with a differential calorimeter (differential scanning calorimeter DSC-60 manufactured by SHIMADZU CORPORATION) at a rate of temperature increase of 10° C. per minute to define the spectrum of the heat capacity, and the intermediate value between the values of two shoulders (Tgm) obtained by a tangent line method from peaks derived from glass transition is defined as glass transition temperature.

An example of a technique for preparing the glycidyl-group-containing polyethylene copolymer is living polymerization of a monomer that serves as the ethylene unit with a monomer that serves as the glycidyl-group-containing (meth)acrylate unit. Examples of such living polymerization include anionic polymerization involving use of an organoalkali metal compound as a polymerization initiator in the presence of a mineral acid salt such as a salt of an alkali metal or alkali earth metal, anionic polymerization involving use of an organoalkali metal compound as a polymerization initiator in the presence of an organoaluminum compound, polymerization involving use of an organic rare earth metal complex as a polymerization initiator, and a radical polymerization involving use of an α-halogenated ester compound as an initiator in the presence of a copper compound.

An example of a technique for preparing the copolymer in which a polymerizable vinyl monomer has been graft-polymerized with the main chain of the polyethylene copolymer is a single-step or multistep polymerization by radical polymerization, in which the polymerizable vinyl monomer is added to the polyethylene copolymer.

Examples of the polymerizable vinyl monomer include an ester vinyl monomer unit, an aromatic vinyl monomer unit, and a vinyl cyanide monomer unit. Examples of the ester vinyl monomer unit include methyl (meth)acrylate, ethyl (meth)acrylate, butyl (meth)acrylate, isobutyl (meth)acrylate, and 2-ethylhexyl (meth)acrylate. Examples of the aromatic vinyl monomer include styrene and vinylnaphthalene. Examples of the vinyl cyanide monomer include acrylonitrile, α-chloroacrylonitrile, and methacrylonitrile.

The weight average molecular weight of the glycidyl-group-containing polyethylene copolymer is, for example, preferably from 3000 to 100000, and more preferably 5000 to 50000. In the case where the weight average molecular weight of the glycidyl-group-containing polyethylene copolymer is less than 3000, impact resistance may be reduced as compared with the case where it is within the above-mentioned range; in the case where the weight average molecular weight of the glycidyl-group-containing polyethylene copolymer is greater than 100000, the dispersibility thereof in the resin composition may be reduced as compared with the case where it is within the above-mentioned range.

The weight average molecular weight (also number average molecular weight) is measured by gel permeation chromatography (GPC). In the measurement of the molecular weight by GPC, a measuring device to be used is GPC-HLC-8120 manufactured by Tosoh Corporation, a column to be used is TSKgel Super HM-M (15 cm) manufactured by Tosoh Corporation, and a solvent is hexafluoroisopropanol. The weight average molecular weight (also number average molecular weight) is calculated using a molecular weight calibration curve obtained from result of the measurement with standard samples of monodisperse polystyrene. The same holds true for the measurement of the weight average molecular weight and number average molecular weight in the following description.

The amount of the glycidyl-group-containing polyethylene copolymer is, for example, preferably in the range of 2 mass % to 15 mass %, and more preferably 3 mass % to 10 mass % relative to the total amount of the polyethylene terephthalate resin and polycarbonate resin in the resin composition. The amount within such a range may enable an enhancement in the impact resistance of a resin molded article to be produced as compared with the case where the amount is out of the range.

The amount of the polyethylene terephthalate resin in the resin composition is, for instance, preferably in the range of 10 mass % to 50 mass %, and more preferably 20 mass % to 40 mass % relative to the total amount of the polyethylene terephthalate resin and polycarbonate resin in the resin composition. The amount of the unreacted polyethylene terephthalate resin in the resin composition is, for example, preferably in the range of 10 mass % to 50 mass %, and more preferably 20 mass % to 40 mass % relative to the total amount of the polyethylene terephthalate resin and polycarbonate resin in the resin composition. In the case where the amount of the polyethylene terephthalate resin in the resin composition and the amount of the unreacted polyethylene terephthalate resin are within such ranges, the molding fluidity of the resin is enhanced as compared with the case where the amounts are out of these ranges, which enables an enhancement in the surface impact strength of the resin molded article in some cases.

The weight average molecular weight of the polyethylene terephthalate resin in the resin composition may be, for example, in the range of 5000 to 100000. The number average molecular weight of the polyethylene terephthalate resin used in the first exemplary embodiment may be, for instance, in the range of 5000 to 50000. In the case where the weight average molecular weight of the polyethylene terephthalate resin is less than 5000 and where the number average molecular weight thereof is less than 5000, the fluidity of the resin composition becomes excessive as compared with the case where the molecular weights are within the above-mentioned ranges, which may result in impairing the processability of a resin molded article. In the case where the weight average molecular weight of the polyethylene terephthalate resin is greater than 100000 and where the number average molecular weight thereof is greater than 50000, the fluidity of the resin composition is reduced as compared with the case where the molecular weights are within the above-mentioned ranges, which may result in impairing the processability of a resin molded article.

The acid value of the polyethylene terephthalate resin in the resin composition may be in the range of 10 eq/t to 15 eq/t. At the acid value of the polyethylene terephthalate resin in the range of 10 eq/t to 15 eq/t, more terminal groups react with glycidyl groups as compared with the case where the acid value of the polyethylene terephthalate resin is less than 10 eq/t, which enables the polyethylene terephthalate resin to have a larger molecular weight. Thus, the surface impact strength of a resin molded article is expected to be further enhanced. Moreover, unnecessary reaction with glycidyl groups is suppressed as compared with the case where the acid value of the polyethylene terephthalate resin is greater than 15 eq/t; hence, gelation of the polyethylene terephthalate material is expected to be reduced. Such a reduction in gelation of the polyethylene terephthalate material inhibits a reduction in the molding fluidity of the resin composition, and the surface impact strength is therefore expected to be further enhanced. The acid value of the polyethylene terephthalate is adjusted by solid phase polymerization. Measurement of the acid value will be described in Examples.

The polyethylene terephthalate resin in the resin composition may contain a polyethylene terephthalate resin collected from the market (hereinafter also referred to as "recycled PET resin"). In the recycled PET resin, hydrolysis has further proceeded as compared with a PET resin that has not used in the market yet; hence, the recycled PET resin is likely to be a PET resin having an acid value ranging from 10 eq/t to 15 eq/t. It is believed that the surface impact strength of a resin molded article is therefore enhanced.

The recycled PET resin is produced, for example, by collecting the resin molded article of a PET resin from the market and grinding it with a grinder such as a dry or wet grinder. The amount of the recycled PET resin is, for instance, preferably not less than 30%, and more preferably not less than 40% relative to the amount of aromatic polyester resin contained in the resin composition. In the case where the amount of the recycled PET resin is not less than 30%, a resin molded article may have a reduced tensile elongation at break as compared with the case where the amount is out of the range.

Polycarbonate Resin

Examples of the polycarbonate resin include an aromatic polycarbonate, a polyorganosiloxane-containing aromatic polycarbonate, an aliphatic polycarbonate, and an alicyclic polycarbonate. An aromatic polycarbonate resin is suitably used in terms of the surface impact strength of a resin molded article. Examples of the aromatic polycarbonate resin include polycarbonates involving bisphenols A, Z, S, MIBK, AP, and TP; polycarbonates involving biphenyl; and polycarbonates involving hydrogenated bisphenol A.

The polycarbonate resin is produced, for example, through the reaction of dihydric phenol with a carbonate precursor.

Examples of the dihydric phenol include 2,2-bis(4-hydroxyphenyl)propane (bisphenol A), bis(4-hydroxyphenyl) methane, 1,1-bis(4-hydroxyphenyl) ethane, 2,2-bis(4-hydroxy-3,5-dimethylphenyl) propane, bis(4-hydroxyphenyl) cycloalkane, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl)ether, and bis(4-hydroxyphenyl)ketone.

Examples of the carbonate precursor include carbonyl halides, carbonyl esters, and haloformates. Specific examples thereof include phosgene, dihaloformates of a dihydric phenol, diphenyl carbonate, dimethyl carbonate, and diethyl carbonate.

The weight average molecular weight (Mw) of the polycarbonate resin may be, for example, in the range of 50000 to 600000. At a weight average molecular weight of the polycarbonate resin in the range of 50000 to 600000, the surface impact strength of a resin molded article may be further enhanced as compared with the case where the weight average molecular weight is out of this range. The number average molecular weight (Mn) of the polycarbonate resin may be, for instance, in the range of 10000 to 30000. At a number average molecular weight of the polycarbonate resin of less than 10000, the fluidity of the resin composition becomes excessive, which may impair the processability of a resin molded article; at a number average molecular weight of the polycarbonate resin of greater than 30000, the fluidity of the resin composition is reduced, which may also impair the processability of a resin molded article.

The amount of the polycarbonate resin is, for example, preferably in the range of 60 mass % to 90 mass %, and more preferably 40 mass % to 80 mass % relative to the total amount of the polyethylene terephthalate resin and the polycarbonate resin in the resin composition. The amount of the polycarbonate resin within such a range enables an enhancement in the molding fluidity of the resin composition as compared with the case where the amount is out of the range, which leads to an improvement in the surface impact strength of a resin molded article in some cases.

The concentration of terminal hydroxyl groups in the polycarbonate resin used in the first exemplary embodiment may be in the range of 10 μeq/g to 15 μeq/g. The concentration of terminal hydroxyl groups in the polycarbonate resin in the range of 10 μeq/g to 15 μeq/g may enable a further enhancement in the surface impact strength of a resin molded article to be produced as compared with the case where the concentration of terminal hydroxyl groups in the polycarbonate resin is less than 10 μeq/g. Furthermore, as compared with the case where the concentration of terminal hydroxyl groups in the polycarbonate resin is greater than 15 μeq/g, a reduction in the molding fluidity of the resin composition is inhibited, and the surface impact strength is therefore further enhanced in some cases. The concentration of terminal hydroxyl groups in a virgin (unused) polycarbonate resin is adjusted by a change in the amount of an end-capping agent used in a polymerization process. The concentration of terminal hydroxyl groups in a polycarbonate resin collected from the market (hereinafter also referred to as "recycled PC resin") depends on usage thereof in the market. Measurement of the concentration of terminal hydroxyl groups will be described in Examples.

The polycarbonate resin used in the first exemplary embodiment may contain a recycled PC resin. In the recycled PC resin, hydrolysis has further proceeded as compared with a polycarbonate resin that has not used in the market yet; hence, the recycled PC resin is likely to be a polycarbonate resin having the concentration of terminal hydroxyl groups from 10 μeq/g to 15 μeq/g. The surface impact strength of a resin molded article is therefore expected to be enhanced.

The recycled PC resin is produced, for example, by collecting the resin molded article of a polycarbonate resin from the market and grinding it with a grinder such as a dry or wet grinder. The amount of the recycled PC resin is, for instance, preferably in the range of 10% to 90%, and more preferably 20% to 80% relative to the amount of the polycarbonate resin contained in the resin composition. It is believed that the amount of the recycled PC resin from 10% to 90% enables a further enhancement in the impact resistance of a resin molded article as compared with the case where the amount is out of this range.

Organic Phosphorus Flame Retardant

Examples of the organic phosphorus flame retardant include aromatic phosphate, aromatic condensed phosphate, phosphinate, and polyphosphate having a triazine skeleton. The organic phosphorus flame retardant to be used may be synthetized or commercially obtained. Examples of commercially available products of the organic phosphorus flame retardant include CR-741 manufactured by DAIHACHI CHEMICAL INDUSTRY CO., LTD., AP422 manufactured by Clariant, and Nova Excel 140 manufactured by RIN KAGAKU KOGYO Co., Ltd.

Flame-Retardant Anti-Drip Agent

Examples of the flame-retardant anti-drip agent include fluororesins such as polytetrafluoroethylene, polyvinylidene fluoride, and polyhexafluoropropylene. Use of the flame-retardant anti-drip agent enables a reduction in dropping (drip) of a resin from a resin molded article that has been burned.

Other Components

The resin composition according to the first exemplary embodiment may contain other components provided that the surface impact strength and flame resistance of a resin molded article to be produced are not impaired. Examples of such other components include a hydrolysis inhibitor, an antioxidant, and a filler.

Examples of the hydrolysis inhibitor include a carbodiimide compound and an oxazoline compound. Examples of the carbodiimide compound include dicyclohexyl carbodiimide, diisopropyl carbodiimide, dimethyl carbodiimide, diisobutyl carbodiimide, dioctyl carbodiimide, diphenyl carbodiimide, and naphthyl carbodiimide.

Examples of the antioxidant include a phenolic antioxidant, an amine antioxidant, a phosphorus antioxidant, a sulfur antioxidant, a hydroquinone antioxidant, and a quinoline antioxidant.

Examples of the filler include clay such as kaolin, bentonite, kibushi clay, and gairome clay; talc; mica; and montmorillonite.

Resin Molded Article

The resin molded article according to a second exemplary embodiment contains the resin composition according to the first exemplary embodiment. The resin molded article according to the second exemplary embodiment is produced through, for instance, molding the resin composition according to the first exemplary embodiment by a technique such as injection molding, extrusion molding, blow molding, or hot press molding. In the second exemplary embodiment, the resin molded article can be produced by injection-molding the resin composition according to the first exemplary embodiment in view of dispersibility of the components contained in the resin molded article.

The injection molding may be, for instance, performed with a commercially available apparatus such as NEX 150 manufactured by NISSEI PLASTIC INDUSTRIAL CO., LTD.; NEX 70000 manufactured by NISSEI PLASTIC INDUSTRIAL CO., LTD.; or SE50D manufactured by TOSHIBA MACHINE CO., LTD. In use of such apparatuses, the cylinder temperature may be, for example, in the range of 170° C. to 280° C. In addition, the mold temperature may be in the range of 30° C. to 120° C. in view of, for instance, productivity.

The resin molded article according to the second exemplary embodiment is appropriately used in applications such as electronic and electrical equipment, household electric appliances, containers, and interior materials for automobiles. More specifically, the resin molded article is used in the housings and various parts of household electric appliances and electronic and electrical equipment; wrapping films; storage cases of CD-ROMs, DVDs, and other products; tableware; food trays; bottles for beverage; and medicine-wrapping materials. Among these, it is suitably used in the parts of electronic and electrical equipment. In particular, the parts of electronic and electrical equipment need to have a high impact resistance and flame resistance. The resin molded article according to the second exemplary embodiment, which is made of the above-mentioned resin composition, has a higher surface impact strength and flame resistance than a resin molded article made of a resin composition containing a polycarbonate resin, a polyethylene terephthalate resin, an organic phosphorus flame retardant, and a flame-retardant anti-drip agent.

EXAMPLES

Examples and Comparative Examples will now be described to explain the invention further in detail, but the invention is not limited to such Examples.

Polycarbonate Resin

A polycarbonate resin (hereinafter referred to as "PC resin") used in Examples and Comparative Examples is a recycled PC resin derived from bottles for beverage.

Polyethylene Terephthalate Resin

A polyethylene terephthalate resin (hereinafter referred to as "PET resin") used in Examples and Comparative Examples is a recycled PET resin derived from bottles made of PET for beverage.

Table 1 shows the weight average molecular weight (Mw), number average molecular weight (Mn), and Mw/Mn of the PC resin; the concentration of terminal hydroxyl groups therein; and the acid value of the PET resin.

Measurement of Concentration of Terminal Hydroxyl Groups

The concentration of terminal hydroxyl groups (μeq/g) in the PC resin refers to the number of the terminal phenolic hydroxyl groups that are present in 1 g of the PC resin. The concentration is measured by colorimetry based on a titanium tetrachloride/acetic acid method [see *Macromol. Chem.* 88215 (1965)].

Measurement of Acid Value

The acid value of the PET resin is measured as follows.

Preparation of Sample

A test piece is ground, vacuum-dried at 70° C. for 24 hours, and then weighed in a balance into 0.20±0.0005 g. This weight is defined as W (g). The weighed test piece and 10 ml of benzyl alcohol are put into a test tube, the test tube is immersed in an oil bath at 205° C., and then the content is dissolved by being stirred with a glass rod. The dissolution of the content is carried out over different lengths of time of three minutes, five minutes, and seven minutes to produce samples A, B, and C, respectively. Then, another test tube is prepared, only benzyl alcohol is put thereinto, and the same procedure is carried out. The dissolution is performed over different lengths of time of three minutes, five minutes, and seven minutes to produce samples a, b, and c, respectively.

Titration

The samples produced in the manner described above are titrated with 0.04 mol/l of a potassium hydroxide solution (solution in ethanol) of which the factor has been known. Phenol red is used as an indicator, and the titer (ml) of the potassium hydroxide solution is determined at the end point at which the color of the samples turns from yellowish green to pink. The titers in the samples A, B, and C are defined as XA, XB, and XC (ml), respectively; and the titers in the samples a, b, and c are defined as Xa, Xb, and Xc (ml), respectively.

Calculation of Acid Value

From the titers XA, XB, and XC corresponding to the individual dissolution times, a titer V (ml) at a dissolution time of zero minute is obtained by a least squares method. Likewise, a titer V0 (ml) is obtained from the titers Xa, Xb, and Xc. Then, an acid value is calculated from the following equation.

Acid Value(eq/t)=[($V$-$V0$)×0.04×$NF$×1000]/$W$

NF: Factor of 0.04 mol/l of potassium hydroxide solution
W: Weight of sample (g)

TABLE 1

| Polycarbonate resin | | Mw | Mn | Mw/Mn | Concentration of terminal hydroxyl groups (μeq/g) |
|---|---|---|---|---|---|
| PC resin | Derived from beverage bottles | 58,500 | 19,400 | 3.02 | 12 |
| Polyethylene terephthalate resin | | Acid value (eq/t) | | | |
| PET resin | Derived from PET beverage bottles | 15 | | | |

Glycidyl-Group-Containing Polyethylene Copolymer

A glycidyl-group-containing polyethylene copolymer is AX8900 (manufactured by Arkema S.A.) which is a copolymer of glycidyl methacrylate/ethylene/methyl acrylate. The composition ratio of glycidyl methacrylate/ethylene/methyl acrylate is 8/68/24 (mass %). The glass transition temperature (Tg) of the glycidyl-group-containing polyethylene copolymer is −33° C.

Example 1

In a tumbler, 78.95 parts by mass of a PET resin and 21.05 parts by mass of a glycidyl-group-containing polyethylene copolymer are mixed with each other. Then, the mixture is melt-kneaded with a twin screw extruder having a vent (TEX-30α manufactured by THE JAPAN STEEL WORKS, LTD.) at barrel (cylinder) and die temperatures of 260° C., a screw-rotating rate of 240 rpm, the degree of vent suction of 100 MPa, and an ejection rate of 10 kg/h to produce pellets. The pellets are dried with a hot-air dryer at 90° C. for 4 hours to yield a melt-kneaded product C-1.

The melt-kneaded product C-1 contains a reaction product of the glycidyl-group-containing polyethylene copolymer with the PET resin and a PET resin that has not reacted with the glycidyl-group-containing polyethylene copolymer. The amount of the reacted PET resin in the reaction product is 5.8 mass % relative to the amount of the whole reaction product. The amount is measured in the manner described above.

Then, 70 parts by mass of a PC resin, 38 parts by mass of the melt-kneaded product C-1, 1 part by mass of a flame-retardant anti-drip agent (trade name "A-3800", 50% polytetrafluoroethylene content, and manufactured by MITSUBISHI RAYON CO., LTD.), and 0.2 parts by mass of an antioxidant (phenolic antioxidant, trade name "Irganox 1076", and manufactured by BASF SE) are mixed with each other in a tumbler. The mixture is subsequently melt-kneaded with a twin screw extruder having a vent (TEX-30α manufactured by THE JAPAN STEEL WORKS, LTD.) at barrel (cylinder) and die temperatures of 260° C., a screw-rotating rate of 240 rpm, the degree of vent suction of 100 MPa, and an ejection rate of 10 kg/h. Furthermore, a flame retardant of aromatic condensed phosphate (trade name "CR-741", 9% phosphorus content, and manufactured by DAIHACHI CHEMICAL INDUSTRY CO., LTD.) is added thereto during the melt-kneading. In particular, the barrel of the twin screw extruder having a vent has 14 segments formed in the longitudinal direction (direction in which materials are extruded), and 15 parts by mass of the flame retardant of aromatic condensed phosphate is put from the inlet of the eighth segment.

A resin is extruded from the twin screw extruder and then cut into pellets. The pellets of the resin composition are dried with a hot-air dryer at 90° C. for 4 hours and then subjected to injection molding with an injection-molding machine (trade name "NEX 500", manufactured by TOSHIBA MACHINE CO., LTD.) at a cylinder temperature of 260° C. and a mold temperature of 60° C. to yield a resin molded article (evaluation sample).

Example 2

Into a twin screw extruder having a vent, 78.95 parts by mass of a PET resin is put; the content in the extruder is melt-kneaded at barrel and die temperatures of 260° C., a screw-rotating rate of 240 rpm, the degree of vent suction of 100 MPa, and an ejection rate of 10 kg/h while 21.05 parts by mass of the glycidyl-group-containing polyethylene copolymer is added at 2.1 kg/h from the inlet of the fifth segment, thereby producing pellets. The pellets are dried with a hot-air dryer at 90° C. for 4 hours to yield a melt-kneaded product C-2. In the melt-kneaded product C-2, the amount of the reacted PET resin in the reaction product is 12.8 mass % relative to the amount of the whole reaction product.

A resin molded article (evaluation sample) is produced as in Example 1 except that the melt-kneaded product C-2 is used.

Example 3

Into a twin screw extruder having a vent, 30 parts by mass of a PET resin is put at 2.42 kg/h. Then, 8 parts by mass of the glycidyl-group-containing polyethylene copolymer is added thereto at 0.64 kg/h from the inlet of the fifth segment; 70 parts by mass of a PC resin, 1 part by mass of a flame-retardant anti-drip agent (trade name "A-3800", 50% polytetrafluoroethylene content, and manufactured by MITSUBISHI RAYON CO., LTD.), and 0.2 parts by mass of an antioxidant (phenolic antioxidant, trade name "Irganox 1076", and manufactured by BASF SE) are added at 1.21 kg/h from the inlet of the seventh segment; and 15 parts by mass of a flame retardant of aromatic condensed phosphate (trade name "CR-741", 9% phosphorus content, manufactured by DAIHACHI CHEMICAL INDUSTRY CO., LTD.) is added at 1.21 kg/h from the inlet of the tenth segments. Then, the content is melt-kneaded at barrel and die temperatures of 260° C., a screw-rotating rate of 240 rpm, the degree of vent suction of 100 MPa, and an ejection rate of 10 kg/h. A resin is extruded from the twin screw extruder and then cut into pellets. The pellets of the resin composition are dried with a hot-air dryer at 90° C. for 4 hours.

The pellets of the resin composition contain a reaction product of the glycidyl-group-containing polyethylene copolymer with the PET resin and a PET resin that has not reacted with the glycidyl-group-containing polyethylene copolymer. The amount of the reacted PET resin in the reaction product is 14.8 mass % relative to the amount of the whole reaction product.

The pellets of the resin composition are subjected to injection molding with an injection-molding machine (trade name "NEX 500", manufactured by TOSHIBA MACHINE CO., LTD.) at a cylinder temperature of 260° C. and a mold temperature of 60° C. to yield a resin molded article (evaluation sample).

Example 4

In a tumbler, 70 parts by mass of a PC resin, 30 parts by mass of a PET resin, 8 parts by mass of a glycidyl-group-containing polyethylene copolymer, 1 part by mass of a flame-retardant anti-drip agent (trade name "A-3800", 50% polytetrafluoroethylene content, and manufactured by MITSUBISHI RAYON CO., LTD.), and 0.2 parts by mass of an antioxidant (phenolic antioxidant, trade name "Irganox 1076", and manufactured by BASF SE) are mixed with each other. Then, the mixture is put into a twin screw extruder having a vent, 15 parts by mass of a flame retardant of aromatic condensed phosphate (trade name "CR-741", 9% phosphorus content, and manufactured by DAIHACHI CHEMICAL INDUSTRY CO., LTD.) is added thereto at 1.21 kg/h from the inlet of the eighth segment, and the content is melt-kneaded. The melt-kneading is performed at higher temperature [barrel (cylinder) temperature of 270° C.] in the second to seventh segments, lower temperature [barrel (cylinder) temperature of 260° C.] in the eighth to fourteenth segments, a screw-rotating rate of 240 rpm, the degree of vent suction of 100 MPa, and an ejection rate of 10 kg/h. A resin is extruded from the twin screw extruder and then cut into pellets. The pellets of the resin composition are dried with a hot-air dryer at 90° C. for 4 hours.

The pellets of the resin composition contain a reaction product of the glycidyl-group-containing polyethylene copolymer with the PET resin and a PET resin that has not reacted with the glycidyl-group-containing polyethylene copolymer. The amount of the reacted PET resin in the reaction product is 3.4 mass % relative to the amount of the whole reaction product.

The pellets of the resin composition are subjected to injection molding with an injection-molding machine (trade name "NEX 500", manufactured by TOSHIBA MACHINE CO., LTD.) at a cylinder temperature of 260° C. and a mold temperature of 60° C. to yield a resin molded article (evaluation sample).

Example 5

The pellets of a resin composition are produced as in Example 4 except that the screw-rotating rate is changed from 240 rpm to 200 rpm. The pellets of the resin composition contain a reaction product of the glycidyl-group-containing polyethylene copolymer with the PET resin and a PET resin that has not reacted with the glycidyl-group-containing polyethylene copolymer. The amount of the reacted PET resin in the reaction product is 3 mass % relative to the amount of the whole reaction product.

The pellets of the resin composition are subjected to injection molding with an injection-molding machine (trade name "NEX 500", manufactured by TOSHIBA MACHINE CO., LTD.) at a cylinder temperature of 260° C. and a mold temperature of 60° C. to yield a resin molded article (evaluation sample).

Comparative Example 1

In a tumbler, 70 parts by mass of a PC resin, 30 parts by mass of a PET resin, 8 parts by mass of a glycidyl-group-containing polyethylene copolymer, 1 part by mass of a flame-retardant anti-drip agent (trade name "A-3800", 50% polytetrafluoroethylene content, and manufactured by MITSUBISHI RAYON CO., LTD.), and 0.2 parts by mass of an antioxidant (phenolic antioxidant, trade name "Irganox 1076", and manufactured by BASF SE) are mixed with each other. The mixture is then put into a twin screw extruder having a vent; 15 parts by mass of a flame retardant of aromatic condensed phosphate (trade name "CR-741", 9% phosphorus content, and manufactured by DAIHACHI CHEMICAL INDUSTRY CO., LTD.) is added thereto at 1.21 kg/h from the inlet of the third segment; and the content is melt-kneaded at barrel and die temperatures of 260° C., a screw-rotating rate of 240 rpm, the degree of vent suction of 100 MPa, and an ejection rate of 10 kg/h. A resin composition is extruded from the twin screw extruder and then cut into pellets. The pellets of the resin composition are dried with a hot-air dryer at 90° C. for 4 hours.

The pellets of the resin composition contain a reaction product of the glycidyl-group-containing polyethylene copolymer with the PET resin and a PET resin that has not reacted with the glycidyl-group-containing polyethylene copolymer. The amount of the reacted PET resin in the reaction product is 2.8 mass % relative to the amount of the whole reaction product.

Comparative Example 2

A predetermined resin molded article (evaluation sample) is produced as in Comparative Example 1 except that the glycidyl-group-containing polyethylene copolymer is not used.

Test and Evaluation

The evaluation samples are subjected to the following tests and evaluations. Table 2 shows the constitution (all on a mass basis) of each of the resin compositions of Examples 1 to 5 and Comparative Examples 1 and 2, the amount of the reacted PET resins, and results of the tests.

Test of Flame Resistance

In accordance with UL-94, a UL-V test is performed with UL specimens for a V test (thickness: 0.8 mm and 1.5 mm), which are defined in UL-94, to measure the degree of the flame resistance of the specimens. The degree of the flame resistance in accordance with UL-94 are not-V, V-2, V-1, V-0, and 5VB in an ascending order of flame resistance.

Test of Heat Resistance

In a state in which a load (1.8 MPa) defined in the test method of ASTM D648 is applied to the evaluation samples, the temperature of the evaluation samples is increased to determine a temperature at which the degree of the deflection thereof reaches a predetermined level (deflection temperature under load: DTUL). This temperature is defined as a thermally resistant temperature and evaluated.

Tensile Strength and Tensile Elongation at Break

The evaluation samples are subjected to measurement of tensile strength and tensile elongation at break in accordance with JIS K-7113. A molded article to be used is a test specimen of JIS 1 (thickness: 4 mm) that has been produced by injection molding. The larger the value of the tensile strength is, the more excellent the tensile strength is; the larger the value of the tensile elongation at break is, the more excellent the tensile elongation at break is.

Test of Impact Resistance

Charpy impact strength (unit: $kJ/m^2$) in the MD direction is measured in accordance with ISO-179 by using a specimen, which has been prepared by notching an ISO multipurpose dumbbell test specimen, with a digital impact tester (DG-5 manufactured by Toyo Seiki Seisaku-sho, Ltd.) at a lifting angle of 150°, 2.0 J of a hammer used, and a measurement number of n=10. The larger the value of the Charpy impact strength is, the more excellent impact resistance is.

Test of Strength of Louver (Opening)

Figure 1:
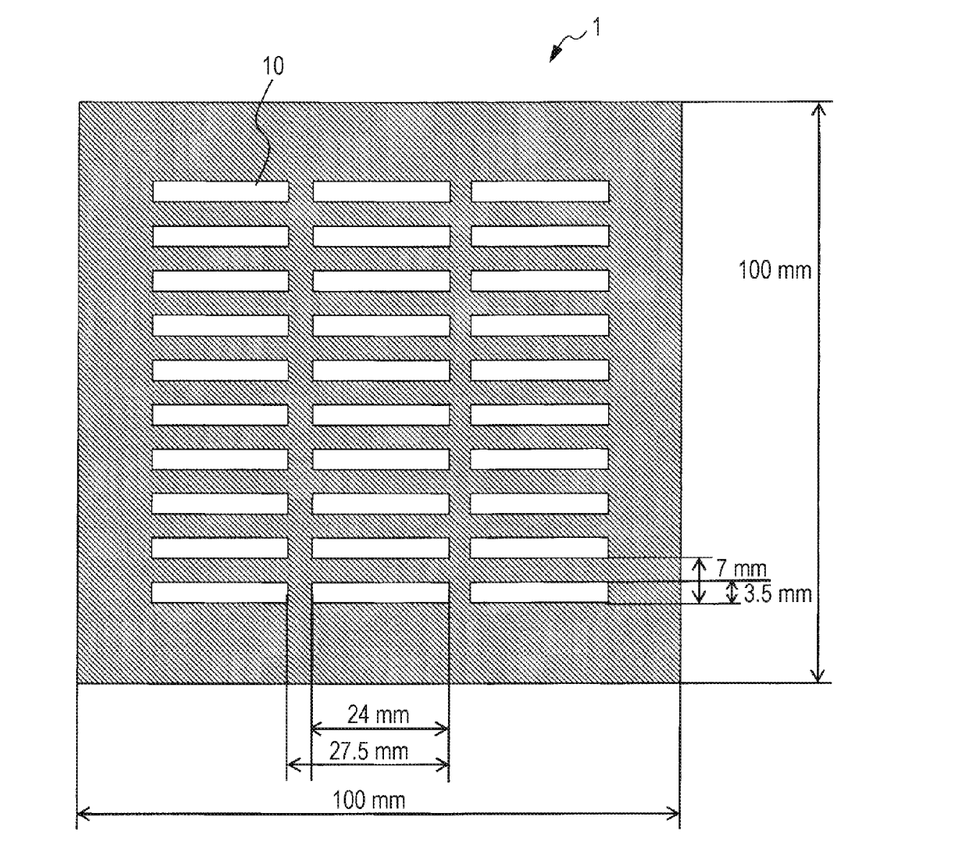
FIG. 1 is a schematic plan view illustrating a test sample used in a strength test of a louver.

A test sample 1 having a grid-like louver 10 (opening) as illustrated in FIG. 1 and a thickness of 2 mm or 1.8 mm is produced with an injection molding machine. A steel ball having a diameter of 50 mm and a weight of 500 g is dropped from a height of 1.3 m to the center of the test sample 1 illustrated in FIG. 1, and the strength of the louver is evaluated on the basis of the following criteria. This test of the strength of louver is carried out three times. The result "A" in the dropping of the steel ball from a height of 1.3 m is practically suitable.

A: No damage is caused in test sample or only minor crack of not more than 1 mm in thickness direction is caused
B: One or two fractured parts are generated around louver
C: Three or more fractured parts are generated around louver

TABLE 2

| | Constitution | Example 1 | Example 2 | Example 3 | Example 4 | Example 5 | Comparative Example 1 | Comparative Example 2 |
|---|---|---|---|---|---|---|---|---|
| Resin composition (part by mass) | PC resin | 70 | 70 | 70 | 70 | 70 | 70 | 70 |
| | PET resin | | | 30 | 30 | 30 | 30 | 30 |
| | Melt-kneaded product C-1 | 38 | | | | | | |
| | Melt-kneaded product C-2 | | 38 | | | | | |
| | Glycidyl-group-containing polyethylene copolymer | | | 8 | 8 | 8 | 8 | |
| | Flame retardant of aromatic condensed phosphate | 15 | 15 | 15 | 15 | 15 | 15 | 15 |
| | Flame-retardant anti-drip agent | 1.0 | 1.0 | 1.0 | 1.0 | 1.0 | 1.0 | 1.0 |
| | Antioxidant | 0.2 | 0.2 | 0.2 | 0.2 | 0.2 | 0.2 | 0.2 |
| Amount of reacted PET resin (mass %) | | 5.8 | 12.8 | 14.8 | 3.4 | 3 | 2.8 | — |
| Results of evaluations | | | | | | | | |
| Flame resistance | UL94 Flame resistance (Thickness 0.8 mm) | V-0 | V-0 | V-0 | V-0 | V-0 | V-1 | not-V |
| | UL94 Flame resistance (Thickness 1.5 mm) | 5VB | 5VB | 5VB | 5VB | 5VB | 5VB | V-2 |
| Heat resistance | DTUL (1.8 MPa) | 72.4 | 74.4 | 74.6 | 72 | 72.2 | 71.2 | 69.8 |
| Mechanical properties | Tensile strength (MPa) | 61 | 62 | 63 | 60 | 60 | 60 | 56 |
| | Tensile elongation at break (%) | 75 | 86 | 85 | 48 | 46 | 42 | 3 |
| | Charpy impact strength ($kJ/m^2$) | 22 | 24 | 25 | 20 | 19 | 17 | 1 |
| Surface impact strength Flat plate Thickness 2.0 mm | Drop height 0.7 m | AAA | AAA | AAA | AAA | AAA | AAA | CCC |
| | Drop height 1.0 m | AAA | AAA | AAA | AAA | AAA | AAA | CCC |
| | Drop height 1.3 m | AAA | AAA | AAA | AAA | AAA | AAA | CCC |
| | Drop height 1.6 m | AAA | AAA | AAA | AAA | AAA | AAA | CCC |
| | Drop height 2.0 m | AAA | AAA | AAA | AAB | AAB | ABB | CCC |
| Strength of louver Thickness 2.0 mm | Drop height 1.3 m | AAA | AAA | AAA | AAA | AAA | AAA | CCC |
| Surface impact strength Flat plate Thickness 1.8 mm | Drop height 0.7 m | AAA | AAA | AAA | AAA | AAA | AAA | CCC |
| | Drop height 1.0 m | AAA | AAA | AAA | AAA | AAA | AAA | CCC |
| | Drop height 1.3 m | AAA | AAA | AAA | AAA | AAA | ABB | CCC |
| | Drop height 1.6 m | ABB | AAB | AAA | BBB | BBB | BBC | CCC |
| | Drop height 2.0 m | BBC | ABB | AAB | CCC | CCC | CCC | CCC |
| Strength of louver Thickness 1.8 mm | Drop height 1.3 m | AAA | AAA | AAA | AAB | ABB | BCC | CCC |

Test of Surface Impact Strength

A flat plate having a size of 60 mm×60 mm and thickness of 2 mm or 1.8 mm is formed by injection molding, and the center of the flat plate is cut to form a square hole of 10 mm×10 mm, thereby producing a test sample. A steel ball having a diameter of 50 mm and a weight of 500 g is dropped from a height ranging from 0.7 to 2 m to the center of the test sample. The surface impact strength thereof is evaluated on the basis of the following criteria. This test of surface impact strength is carried out three times for each of different heights. The result "A" in the dropping of the steel ball from a height of 1.3 m is practically suitable.

A: No damage is caused around square hole of test sample
B: One to three cracks are caused around square hole of test sample
C: Test sample is broken into multiple pieces As is clear from Table 2, each of the resin molded articles of Examples 1 to 5 and Comparative Example 1, which has been formed of a resin composition containing a PC resin, a reaction product of a glycidyl-group-containing polyethylene copolymer with a PET resin, an unreacted PET resin, an organic phosphorus flame retardant, and a flame-retardant anti-drip agent, has a higher surface impact strength and flame resistance than the resin molded article of Comparative Example 2, which has been formed of a resin composition containing a PC resin, a PET resin, an organic phosphorus flame retardant, and a flame-retardant anti-drip agent. Furthermore, the resin molded articles of Examples 1 to 5, in which the amount of the reacted PET resin in the reaction product is approximately not less than 3 mass % relative to the total amount of the reaction product and unreacted PET resin, have a higher surface impact strength than the resin molded article of Comparative Example 1, in which such an amount is less than 3 mass %.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
 a polycarbonate resin;
 a reaction product of a glycidyl-group-containing polyethylene copolymer with a polyethylene terephthalate resin;
 a polyethylene terephthalate resin that has not reacted with the glycidyl-group-containing polyethylene copolymer;
 an organic phosphorus flame retardant; and
 a flame-retardant anti-drip agent, wherein
 the amount of a reacted polyethylene terephthalate resin in the reaction product is at least 3 mass % relative to the amount of the whole reaction product.

2. A resin molded article comprising the resin composition according to claim 1.

3. The resin composition according claim 1, wherein the amount of a reacted polyethylene terephthalate resin in the reaction product is from 3.5 to 20 mass % relative to the amount of the whole reaction product.

4. The resin composition according to claim 1, wherein the amount of a reacted polyethylene terephthalate resin in the reaction product is from 5 to 15 mass % relative to the amount of the whole reaction product.

* * * * *